United States Patent [19]

Clougherty et al.

[11] 3,775,138

[45] Nov. 27, 1973

[54] REFRACTORY DIBORIDE MATERIALS

[76] Inventors: Edward V. Clougherty, 20 Pleasant Valley Cir., West Roxbury, Mass.; David Kalish, 2716 Ridgewood Rd., N.W., Atlanta, Ga.

[22] Filed: Dec. 22, 1971

[21] Appl. No.: 211,081

Related U.S. Application Data

[63] Continuation-in-part of Ser. No. 728,055, May 9, 1968, abandoned.

[52] U.S. Cl. .................... 106/44, 106/56, 106/57
[51] Int. Cl.. C04b 35/52, C04b 35/56, C04b 35/58
[58] Field of Search .................. 106/43, 44, 55, 57, 106/56

[56] References Cited
UNITED STATES PATENTS
2,814,566  11/1957  Glaser .................................. 106/43
3,433,471  3/1969  Alper ............................... 106/43 X Primary Examiner—Helen M. McCarthy
Attorney—Alfred H. Rosen and Frank A. Steinhilper

[57] ABSTRACT

New and improved diboride materials containing $TiB_2$, $ZrB_2$, $HfB_2$ or others are produced by adding about 15 percent to 50 percent by volume of SiC and C. Carbon is included in an amount between about 2 percent and 40 percent, preferably about 5 percent to about 30 percent and SiC between about 10 percent and about 45 percent, preferably about 15 percent to about 30 percent. Improved properties include, among others, lower fabrication temperature, grain size control, oxidation resistance, improved machinability, corrosion resistance to gases containing fluoride, strength, thermal stress resistance and the like; improvement is gained not only in comparison with the diboride itself, but also in comparison with the diboride and either SiC or C without the other.

13 Claims, No Drawings

REFRACTORY DIBORIDE MATERIALS

BACKGROUND OF THE INVENTION

This application is a continuation-in-part of U.S. patent application, Ser. No. 728,055 filed May 9, 1968, now abandoned.

New refractory materials are constantly being required to meet the needs of modern industry and of space technologies. While the pure refractory metals with melting points above 2000°C., such as molybdenum, tantalum and tungsten, generally have many satisfactory properties, they all oxidize catastrophically in air at elevated temperatures (that is, temperatures above 1,200°C.). For structural applications, it has been necessary to investigate refractory metal compounds such as borides, silicides, carbides and aluminides of these metals, which exhibit better oxidation resistance. While certain metals and alloys have value as high temperature materials, the borides and silicides of the transition elements in Groups IV, V and VI of the periodic table (Ti, Zr, Hf, V, Nb, Ta, Cr, Mo W) have been found to be particularly attractive in this respect. Empirically, molybdenum disilicide and zirconium diboride, are among the most valuable prior high temperature materials.

These refractory metal compounds also may have several problems. For example, a number of materials, particularly including those which have been used to avoid oxidation and its consequences have certain mechanical and processing problems which impair their use for certain purposes. Among the improvements needed are additional oxidation resistance, improved mechanical properties, improved corrosion resistance to fluorine containing atmospheres, improvement in thermal stress resistance, reduction in the temperature required for fabrication of fully dense billets by conventional hot pressing relative to the same refractory compound with no additive, improvement in the mechanical integrity of hot pressed billets and improved machining characteristics of hot pressed billets.

SUMMARY OF THE INVENTION

The use of ceramic additives effects these and other improvements without greatly reducing the high temperature performance of the base diboride materials as would obtain if low melting metal binders were used to effect improvements in strength and enhance fabrication. The latter procedure is well known and has been used to develop many "cermet" materials such as the tungsten carbide-cobalt binder materials.

We have found that the desired results can be achieved by incorporating in a diboride material such as $ZrB_2$, $TiB_2$, $HfB_2$, $NbB_2$ or $TaB_2$ or the like, (both stoichiometric and off-stoichiometric proportions) of about 15 percent by volume to about 50 percent by volume of carbon and a material improving oxidation resistance and other properties, such as SiC. The SiC can be employed in an amount of about 10 percent to about 45 percent of the material, preferably in an amount of about 15 percent to about 30 percent. A number of materials of improved properties have been made with about 1 part by volume of SiC to about 4 parts by volume of diboride. The carbon may be employed in an amount between about 2 percent by volume and about 45 percent by volume, preferably in an amount of about 5 percent to about 30 percent.

DESCRIPTION OF THE INVENTION

A number of diboride materials were prepared for comparative test purposes. The general procedure for the preparation was as follows, using the same grades of materials for the purpose of avoiding unintentional variation in product. The diboride powders (commercially available —325 mesh or finer) are dry milled with silicon carbide powders (commercially available, $5\mu$ average particle size) and carbon powder (commercially available submicron powder) and the mixture is transferred to the mold of a conventional hot pressing apparatus and consolidated. There is not a specific threshold of size of the powders critical to the operability of the invention, but finer starting powders produce billets with finer grain sizes and consequently higher strength and related mechanical properties.

The diboride article in accordance with the present invention is a hot pressed mixture of $TiB_2$, $ZrB_2$, $TaB_2$ or $NbB_2$, containing SiC and C. In the range of compositions recorded in Tables 1 and 2, the volume percentages of phases varied from 56$ZrB_2$-14SiC-30C to 76$ZrB_2$-19SiC-5C. The resulting billet contains a fine grained diboride matrix with discreet grains of silicon carbide and carbon. The aforesaid article of this invention is characterized by improved mechanical integrity, nearly full relative density, improved oxidation resistance, improved thermal stress resistance, improved resistance to corrosion in atmospheres containing fluorine, and generally improved mechanical properties. In addition, the article can be machined with carbide and other conventional ceramic tool materials or if diamond tools are employed any particular maching operation can be completed in less time and/or with less tool wear, or both, than with the diboride itself.

In addition to enhancing fabrication and improving the properties cited above, the additives of SiC and C to $TiB_2$, $ZrB_2$ and $HfB_2$ reduce the total cost of powder required to prepare a given sized billet. The cost reduction is most shocking for $HfB_2$ which currently is many times more expensive than SiC and carbon. The lower fabricating temperatures required for these compositions and the reduction in die wall and punch surface interaction as compared to the same diborides with no additives combine to effect further cost saving in the fabrication procedure.

The following example is presented in illustration of one method of producing improved hot pressed products according to the present invention

EXAMPLE

Commercially available zirconium diboride powder (-325 mesh or finer) was mixed with commercially available silicon carbide powder (5 micron average particle size) and carbon powder (commercially available submicron powder) in various percentage compositions set forth in Table 1. The powders were mixed by dry milling and transferred to a hot pressing mold. The powders were then hot pressed under a pressure of about 4,000 pounds per square inch for various periods of time, approximately two hours, at temperatures about 2,100°C. After pressing, the hot pressed, shaped products were cooled and removed from the mold. Fine grain size shaped products thus produced had virtually 100 percent theoretical density. The products have good oxidation resistance, improved thermal stress resistance and other improved properties. They are machinable. Fabrication conditions are set forth in Table 1.

For comparison purposes, test data are shown in Tables 1 and 2 with various materials based on zirconium diboride. Other materials have been prepared from mixes based on the hafnium diboride and titanium diboride, illustrating comparable improvement in properties with similar ranges of SiC and carbon, and materials based on niobium diboride and tantalum diboride also can be improved in performance and properties through the addition of SiC and carbon.

Illustrative examples of the property improvements in the hot pressed diboride-SiC-C compositions and the other advantages of using these compositions relative to diborides with no additives are provided by the following data. Some of the property improvements are related to a common material improvement such as fine grain size, high density and improved mechanical integrity. It is common knowledge in ceramic materials science that fine grain size and high density improve strength properties.

Improvements relating to fabrication and the mechanical integrity of hot pressed billets are evidenced in part by the data in Table 1.

TABLE 1.—FABRICATION PARAMETERS AND BILLET CHARACTERISTICS FOR CERTAIN DIBORIDE-SIC-C COMPOSITIONS

| Material | Temp., °C. | Pressure, p.s.i. | Time, min. | Density, percent | Boride grain size, microns |
|---|---|---|---|---|---|
| 56ZrB$_2$, 14SiC, 30C | 2,100 | 4,000 | 90 | 100 | 5 |
| 68ZrB$_2$, 17SiC, 15C | 2,050 | 4,000 | 120 | 100 | 4 |
| 72ZrB$_2$, 18SiC, 10C | 2,100 | 4,000 | 108 | 100 | 3 |
| 76ZrB$_2$, 19SiC, 5C | 2,100 | 4,000 | 100 | 100 | 4 |
| 100ZrB$_2$ | 2,100 | 4,000 | 75 | 96 | 35 |
| 100ZrB$_2$ | 2,150 | 4,000 | 120 | 99 | 70 |

In addition, the incidence of cracking in 100 ZrB$_2$ is approximately 30 per cent whereas the no cracking was observed in the hot pressed billets of the ZrB$_2$-SiC-C compositions. The reduction in the temperature required to effect full densification coupled with the control of grain growth for the diboride matrix demonstrate the enhancement of the fabrication. The use of the lower hot pressing temperature substantially reduced reactions between the consolidating diboride billet and the surface of the die walls and the punch.

Improvements relating to mechanical properties and thermal stress resistance are illustrated in part by the data in Table 2, showing data relating to tests performed on materials based on zirconium boride over the same range of proportions of SiC and carbon as in Table 1.

creases. The addition of C and to a lesser extent SiC lowers the absolute density of the fully dense billet, hence, the strength to weight ratio, an important structural parameter, increases relative the diboride with no additive. The reduction in the absolute magnitude of the density of a fully dense diboride billet containing SiC and C is particularly striking for HfB$_2$. For example, one lot of HfB$_2$ powder afforded a fully dense billet with an absolute density of 10.3 g/cc; a fully dense billet of 56 HfB$_2$-14SiC-30C was prepared with a density of 7.2 g/cc.

There was about 50% improvement in high temperature corrosion resistance to atmospheres containing fluorine for 56 ZrB$_2$-14SiC-30C compared to 100 ZrB$_2$, and comparable improvement is realized throughout the ranges of proportions in the materials of the invention. The SiC-C diboride material is characterized by a lower surface recession rate which decreases with increasing temperature than that observed for ZrB$_2$ (which increases with increasing temperature).

On a volume per cent basis, the improvements imparted to zirconium diboride materials as illustrated in the tables, and as described hereinbefore, are generally translatable into equivalent improvement in hafnium diboride, tantalum diboride, niobium diboride and titanium diboride. For example, like improvements are realized in materials including: 72 volume per cent titanium diboride, 18 volume per cent silicon carbide and 10 volume per cent carbon; and 72 volume per cent hafnium boride, 18 volume per cent silicon carbide and 10 volume per cent carbon. These two materials are characterized by high oxidation resistance, good mechanical properties, excellent thermal stress resistance and substantially increased machinability, and other properties, as compared with titanium boride or hafnium boride without silicon carbide and carbon, and the quality of improvement is greatly similar to the improvement (on a volume per cent basis) in zirconium diboride materials. Niobium diboride and tantalum diboride, which are not generally used in today's technology can also be improved where special use or application needs require the specific properties of these materials.

The carbon employed in the invention may be incorporated in a variety of morphological forms or particle sizes. Size and morphology are not believed to be critical, and the advantages of the invention are realized with other forms.

Inasmuch as the invention is operative with diboride compounds in both stoichiometric (whole-number atomic) and non-stoichiometric (other than whole-number atomic) proportions, use of the terms HfB$_2$ and ZrB$_2$, TiB$_2$, TaB$_2$ and NbB$_2$ in the claims which follow

TABLE 2.—MECHANICAL PROPERTIES OF CERTAIN DIBORIDES-SIC-C COMPOSITIONS

| Material | Density | | Grain size (ZrB$_2$), microns | Bend strength, 10$^3$ p.s.i. at— | | | | Young's modulus, 10$^6$ p.s.i., 25° C. |
|---|---|---|---|---|---|---|---|---|
| | D, percent | G./cc. | | 25° | 800° | 1,400° | 1,800° | |
| 56ZrB$_2$,14SiC,30C | 100 | 4.5 | 5 | 41 | 45 | 40 | 47 | 30 |
| 68ZrB$_2$,17SiC,15C | 100 | 5.0 | 4 | 58 | 70 | 36 | 33 | 49 |
| 72ZrB$_2$,18SiC,10C | 100 | 5.3 | 3 | 72 | 90 | 53 | 42 | 56 |
| 76ZrB$_2$,19SiC,5C | 100 | 5.5 | 4 | 68 | 77 | 45 | 45 | 63 |
| 100ZrB$_2$ | 98 | 6.0 | 56 | 35 | 43 | 23 | 23 | 65 |

The fully dense-fine grain size diboride compositions display higher strength values from room temperature to 1,800°C. The elastic modulus decreases with increasing C content hence the strength to elastic modulus ratio increases, and the thermal stress resistance inis intended to include, in each case, both the whole-number atomic proportions for the compound and the proportions other than the whole-number atomic proportions, unless the context of the claim specifically limits the term to a smaller range of proportions.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

We claim:

1. As a new hot pressed diboride material of improved properties a mixture consisting essentially of at least 50 percent by volume of a metal diboride wherein the metal is titanium, zirconium, hafnium, niobium or tantalum and about 15 percent to about 50 percent by volume of two materials silicon carbide and carbon, the silicon carbide being included in an amount between about 10 percent by volume and about 45 percent by volume, and the carbon being included in an amount between about 2 percent by volume and about 40 percent by volume, said mixture fabricated by pressing at an elevated temperature.

2. The hot pressed diboride material of claim 1, wherein the diboride is $TiB_2$.

3. The hot pressed diboride material of claim 1, wherein the diboride is $ZrB_2$.

4. The hot pressed diboride material of claim 1, wherein the diboride is $HfB_2$.

5. The hot pressed diboride material of claim 1, wherein the silicon carbide is included in an amount between about 15 per cent by volume and about 30 per cent by volume, and the carbon is included in an amount between about 5 per cent by volume and 30 per cent by volume.

6. The hot pressed diboride material of claim 5, wherein the diboride is zirconium diboride.

7. The hot pressed diboride material of claim 5, wherein the diboride is titanium diboride.

8. The hot pressed diboride material of claim 5, wherein the diboride is hafnium diboride.

9. As a new hot pressed diboride material of improved machinability and improved high temperature properties a mixture consisting essentially of about 72 volume per cent zirconium diboride, about 19 volume per cent silicon carbide and about 10 volume per cent carbon, said mixture fabricated by pressing at an elevated temperature.

10. As a new hot pressed diboride material of improved machinability and improved high temperature properties a mixture consisting essentially of about 56 volume per cent zirconium diboride, 14 volume per cent silicon carbide and about 30 volume per cent carbon, said mixture fabricated by pressing at an elevated temperature.

11. A machinable formed diboride refractory article having improved high temperature characteristics consisting essentially of a shaped hot pressed mixture of at least 50 percent by volume, based on the amount of solids, of a metal diboride of Ti, Zr, Hf, Nb, or Ta, about 15 percent to 50 percent by volume of two materials silicon carbide and carbon, the silicon carbide being in an amount between about 10 percent by volume and about 45 percent by volume, and the carbon being in an amount between about 2 percent by volume and about 40 percent by volume.

12. A machinable formed diboride according to claim 11, wherein the silicon carbide is in an amount between about 15 per cent by volume and about 30 per cent by volume, and the carbon is in an amount between about 5 per cent by volume and about 30 per cent by volume.

13. A machinable formed diboride according to claim 12, wherein the diboride is zirconium diboride.

* * * * *

PO-1050
(5/69)

UNITED STATES PATENT OFFICE
CERTIFICATE OF CORRECTION

Patent No. 3,775,138      Dated November 27, 1973

Inventor(s) Edward V. Clougherty; David Kalish

It is certified that error appears in the above-identified patent and that said Letters Patent are hereby corrected as shown below:

Col. 2, line 19, after "$ZrB_2$" insert -- $HfB_2$ --

Col. 2, line 33, delete "maching" and insert --machining--.

Signed and sealed this 23rd day of April 1974.

(SEAL)
Attest:

EDWARD M. FLETCHER, JR.
Attesting Officer

C. MARSHALL DANN
Commissioner of Patents